(12) United States Patent
Ito

(10) Patent No.: US 6,910,784 B2
(45) Date of Patent: Jun. 28, 2005

(54) PANEL LIGHT SOURCE DEVICE AND FABRICATION PROCESS FOR THE SAME

(75) Inventor: Atsushi Ito, Kumamoto (JP)

(73) Assignee: Advanced Display Inc., Kumamoto (JP)

( * ) Notice: Subject to any disclaimer, the term of this patent is extended or adjusted under 35 U.S.C. 154(b) by 110 days.

(21) Appl. No.: 10/392,565

(22) Filed: Mar. 20, 2003

(65) Prior Publication Data

US 2003/0179566 A1 Sep. 25, 2003

(30) Foreign Application Priority Data

Mar. 25, 2002 (JP) ........................................ 2002-084154

(51) Int. Cl.[7] ............................................ G02F 1/1335
(52) U.S. Cl. ............................ 362/31; 362/221; 349/58
(58) Field of Search .......................... 362/31, 221, 330, 362/367–370, 391, 457, 581, 26; 349/58, 67, 62–64; 445/69; 438/30

(56) References Cited

U.S. PATENT DOCUMENTS 5,949,505 A  *  9/1999  Funamoto et al. ............ 349/65

* cited by examiner

Primary Examiner—Sandra O'Shea
Assistant Examiner—Guiyoung Lee
(74) Attorney, Agent, or Firm—Milton Oliver, Esq.; Ware Fressola Van Der Sluys & Adolphson LLP

(57) ABSTRACT

A panel light source device includes: a light guide plate 1; a reflecting sheet 5, provided facing a rear face of the light guide plate 1, and an end of which is bent, so as to face a side face of the light guide plate 1; a wire 4 disposed at a side face of the light guide plate 1, sandwiching the reflecting sheet 5 therebetween; and a slim case, wherein the slim case is constructed of a rear face case 7, a front face of which is open, the light guide plate 1, the reflecting sheet 5 and the wire 4 being inserted into the case 7 through the front face thereof, and a front face case 6 then being engaged with the rear face case 7. The rear face case 7 has a reflecting sheet exposing section 14, formed so that a height, of a portion of a side face on the wire side, is lower than the height of a remaining portion of the side face, to thereby expose the reflecting sheet 5. Thus, the assembly of a panel light source device is made easy.

9 Claims, 10 Drawing Sheets

PANEL LIGHT SOURCE DEVICE AND FABRICATION PROCESS FOR THE SAME

BACKGROUND OF THE INVENTION

1. Field of the Invention

The present invention relates to a panel light source device and a fabrication process for the same, more particularly to improvement on a panel light source device and a fabrication process for the same, which is used in a display device for mainly presenting letters, an image and others thereon, for example a liquid crystal display device.

2. Description of the Related Art

A liquid crystal display device has features such as being slim, light, low in power consumption and others in comparison with other kinds of display devices, and has been widely used as display devices for use in various applications such as those starting with a computer, followed by portable terminals including a portable telephone, a car navigation terminal and others. In a case of a liquid crystal display device, since a liquid crystal panel on which image information on each pixel is reproduced does not emit light by itself, a light source device is required additionally, so that a liquid crystal display device is commonly equipped with a light source device called a back light device emitting light at a rear face side of a liquid crystal panel.

In such a display device, since there is necessity that a display region for an image or the like is illuminated uniformly by light, there has been a demand for a panel light source device, having a light emitting surface corresponding to the display region, and being excellent in uniformity of a light emitting characteristic on the light emitting surface. Furthermore, a request has been made for downsizing and weight reduction of the light source device in order to realize downsizing and weight reduction of the light display device as a whole. For this reason, in this kind of a light source device, a side light type has been commonly adopted in which a linear shaped light emitter is disposed at the side-face side of a light guide plate.

FIG. 9 is a sectional view showing a construction of a conventional panel light source device, showing an example of a liquid crystal display device with a back light device adopting a side light type. In the figure, a numerical reference 1 indicates a light guide plate, 2 an optical sheet, 3 a light emitter, 4 a wire, 5 a reflecting sheet, 6 a front face case, 7 a rear face case and 12 an opening section. The constituents 1 to 5 are housed in a composite case formed by engaging the front face case 6 and the rear face case 7 with each other to construct a panel light source device and a liquid crystal panel 10 is mounted outside the opening section 12 of the panel light source device to construct a display device.

In order to realize downsizing and weight reduction of the light source device, the reflecting sheet 5 is provided not only on the rear face side of the light guide plate 1, but also used as a lamp reflector obtained by bending an end portion in the light emitter 3 side into the shape of a Greek letter Π open sideways and light emitted from the light emitter 3 strikes an light incident face provided at a side face of the light guide plate 1. An end portion in the wire 4 side of the reflecting sheet 5 is bent into the shape of an erected L to reflect light emitting through a side face of the light guide plate 1 thereon and to thereby prevent leakage of the incident light from the light emitter 3 through the side face of the light guide plate 1 opposite to the light incident face. Hence, the incident light from the light emitter 3 exits from the front face of the light guide plate 1 (the optical sheet 2 side). The light leaving the front face is emitted through the opening section 12 through the optical sheet 2 and the opening section 12 works as a light emitting surface.

FIG. 10 is a sectional view showing a way of assembly of the panel light source device of FIG. 9. The reflecting sheet 5 is at first housed in the rear face case 7 and thereafter, the light emitter 3 and the wire 4 are housed. The wire 4 is a power supply line for supplying a power source to a fluorescence discharge tube, and the light emitter 3 and the wire 4 commonly construct a light emitter unit.

While the reflecting sheet 5 is bent at both end portions and housed in the rear face case 7, the sheet assumes a state where being open at bend portions in the rear face case 7 in a case where bending is insufficient or where a repulsive force against bending of the reflecting sheet 5 is strong. The wire 4 is necessary to be placed in a clearance between an end portion of the reflecting sheet 5 bent in the shape of an erected letter L and a side face of the rear face case, however, in a case where the bend portion of the reflecting sheet 5 contained in the rear face case 7 is open, a problem has arisen that a subsequent operation of housing the wire at a prescribed position is not easy.

Especially, in a case where a resin sheet is used as the reflecting sheet 5 for a purpose to attain a weight reduction, the resin sheet is a flexible material strong in restoring force against a bending pressure, so the reflecting sheet 5 is easy to open at a bend portion to deteriorate a work in housing the wire 4, having led to a difficulty in efficiently performing assembly.

SUMMARY OF THE INVENTION

It is an object of the present invention to provide a panel light source device whose assembly is easy. It is another object of the present invention to provide a fabrication process for a panel light source device excellent in work efficiency. It is still another object of the present invention to provide a fabrication process for a panel light source device capable of efficiently performing a wire housing work and a panel light source device obtained by such a fabrication process, especially in a case where a panel light source device using a material strong in repulsive force against bending as a reflecting sheet.

A panel light source device according to the present invention includes: a light guide plate emitting incident light thereon from a front face thereof; a reflecting sheet, provided facing a rear face of the light guide plate, and an end of which is bent so as to face a side face of the light guide plate; a wire disposed at a side face of the light guide plate sandwiching the reflecting sheet therebetween; and a slim case housing the light guide plate, the reflecting sheet and the wire. The above slim case is constructed of: a rear face case a front face of which is open, the light guide plate, the reflecting sheet and the wire being housed therein through the front face thereof, and a front face case engaged with the rear face case, the rear face case having an reflecting sheet exposing section formed so that a height of a portion of a side face in the wire side is lower than the other portion to expose the reflecting sheet.

With such a construction adopted, the rear face case housing the reflecting sheet has the reflecting sheet exposing section at a side face thereof in the wire side to expose the reflecting sheet at the side face thereof when the wire is housed. Hence, an assembly work can be facilitated in which the wire is disposed at an outside of the bend portion of the reflecting sheet. Especially in a case where a panel light source device using a material strong in repulsive force against bending as that of the reflecting sheet, a work to house the wire into the case can be efficiently performed. By facilitating a assembly work, a high quality panel light source device can be supplied at a low cost or stably.

Further, a panel light source device according to the present invention is of a construction in which the rear face case has a reflecting sheet exposing section including an open end portion for exposing the reflecting sheet at a portion of a side face thereof in the wire side.

Further, a panel light source device according to the present invention is of a construction in which the rear face case has a reflecting sheet exposing section exposing a portion including an end portion of the reflecting sheet in the front face side at a portion of a side face thereof in the wire side.

Further, a panel light source device according to the present invention is of a construction in which the rear face case is in the shape of an approximate box and the reflecting sheet exposing section is formed at an end portion of a side face of the rear face case in the wire side.

Further, a panel light source device according to the present invention is of a construction in which the wire is disposed extending over two or more side faces adjacent to each other of the light guide plate and the reflecting sheet exposing sections are formed at both farther end portions of side faces adjacent to each other of the rear face case along which the wire is provided.

Further, a panel light source device according to the present invention is of a construction in which an end portion of the reflecting sheet exposing section is formed with an angle open upwardly so that a width of the front face side of the reflecting sheet exposing section is wider than that of the rear face side thereof.

A fabrication process for a panel light source device according to the present invention includes: a reflecting sheet housing step of housing a reflecting sheet bent at a end portion into a rear face case a front face of which is open; a light emitter unit housing step of, when a light emitter unit constructed of a light emitter and a wire is housed into the rear face case, not only housing the light emitter on the reflecting sheet, but also housing the wire in a clearance between the reflecting sheet and a side face of the rear face case while pressing the reflecting sheet from the outside of a side face of the rear face case through the reflecting sheet exposing section provided to the side face of the rear face case; a light guide plate housing step of housing a light guide plate into the rear face case; and a case engaging step of engaging a front face case with the rear face case.

The above and further objects and novel features of the invention will more fully appear from the following detailed description when the same is read in connection with the accompanying drawing. It is to be expressly understood, however, that the drawing is for purpose of illustration only and is not intended as a definition of the limit of the invention.

DESCRIPTION OF PREFERRED EMBODIMENTS

Figure 1:
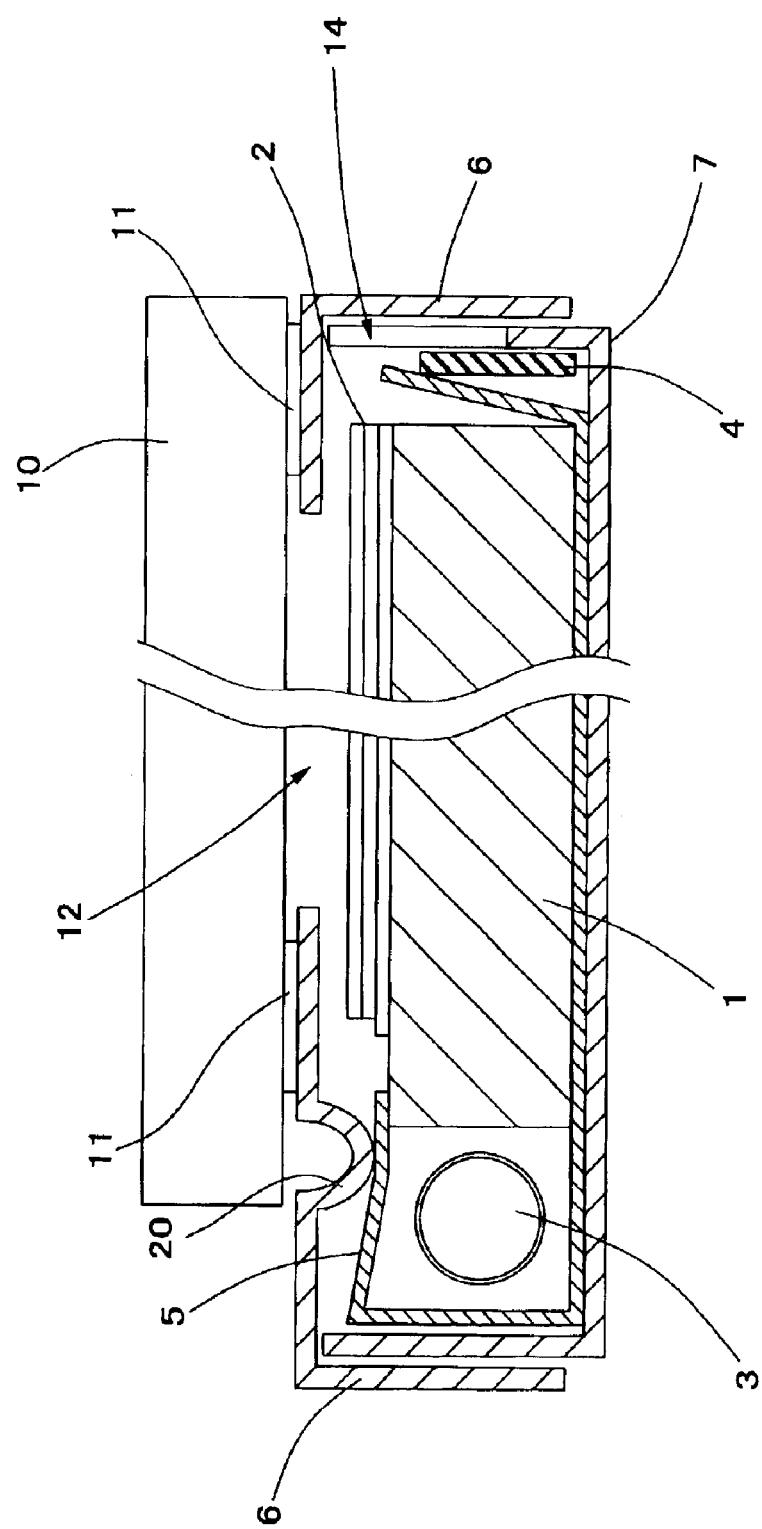
FIG. 1 is a sectional view showing an example construction of a display device including a panel light source device according to the present invention.

FIG. 1 is a sectional view showing an example construction of a display device including a panel light source device according to the present invention. In the figure, a numerical reference 1 indicates a light guide plate, 2 an optical sheet, 3 a light emitter, 4 a wire, 5 a reflecting sheet, 6 a front face case, 7 a rear face case, 10 a liquid crystal panel, 11 a double-sided tape, 12 a opening section, 14 a reflecting sheet exposing section and 20 a reflecting sheet contact section. The light guide plate 1, the optical sheet 2, the light emitter 3, the wire 4 and the reflecting sheet 5 are housed in a composite case obtained by engaging the front face case 6 and the rear face case 7 with each other to construct a panel light source device and the liquid crystal panel 10 is mounted thereto with the double-sided tape 11 to further construct a liquid crystal display device.

The light guide plate 1 is a transparent light guide made of an acrylic resin or the like, having a prescribed refractive index and molded as a plate-like object in the shape of an approximate rectangle. The light guide plate 1 is constructed so that one or more side faces thereof are served as an light incident face or faces and a front face thereof (a side of the opening section 12) is served as a light emitting face, wherein incident light striking the light incident face or faces is almost uniformly emitted through the light emitting face. The optical sheet 2 is placed on the light emitting face of the light guide plate 1 and an optical correction sheet to make the emitting light from the light guide plate 1 uniform or to make the emitting light therefrom highly luminous.

The light emitter 3 is a linear shaped light source such as a fluorescence discharge tube disposed along a side face of the light guide plate 1 at the side-face side thereof and supplies incident light on the light incident face of the light guide plate 1. The wire 4 is a power supply line for supplying a power source to the fluorescence discharge tube. The light emitter 3 and the wire 4 construct a light emitter unit.

Figure 2:
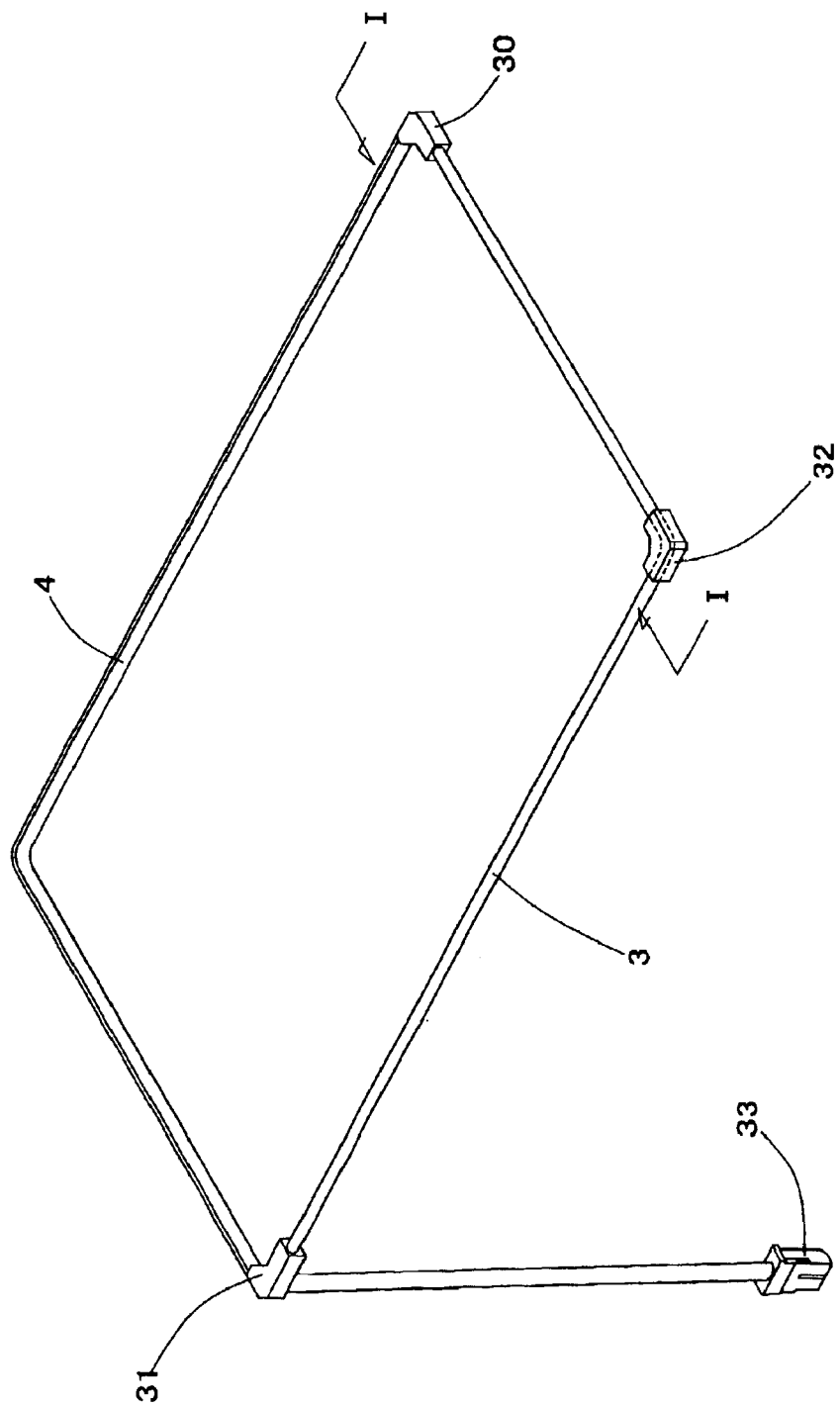
FIG. 2 is a perspective view showing an example of a light emitter unit and a light emitter 3 and a wire 4 shown in FIG. 1 corresponds to a section taken along line I—I of FIG. 2.

FIG. 2 is a perspective view showing an example of a light emitter unit and a light emitter 3 and a wire 4 shown in FIG. 1 corresponds to a section taken along line I—I of FIG. 2 The light emitter 3 is a light emitter of a letter L type at both ends of which discharging electrode sections 30 and 31 are provided, the wire 4 is a flat cable of a letter L type and a power source is supplied to the discharging electrode sections 30 and 31 through the wire 4 from a power source connector 33 That is, the light emitter unit is in the shape of an approximate rectangle, the discharging electrodes 30 and 31 are disposed at diagonally opposed vertices thereof, one of the other vertices corresponds to a bend section of the light emitter 3 and a corner holder 32 made of an elastic material (for example of rubber) is provided at the bend section.

The reflecting sheet 5 reflects light deviating from a light guide path (a proper path along which light is transmitted through the light guide plate 1 and the optical sheet 2, and emitted from the opening section 12) of light coming out from the light emitter 3 back to the light guide path not only to improve a luminance of the panel light source device, but also to prevent stray light from occurring so as to make the luminance on the light emitting surface uniform. The reflecting sheet 5 is made of a member high in surface reflectance and formed in a thin sheet using aluminum, a resin or the like and disposed abutting on the rear face of the light guide plate 1 on the back side thereof, covering all over the surface of the rear face thereof. That is, the reflecting sheet 5 is provided facing a face opposite to the light emitting face of the light guide plate 1.

The end portion at the light emitter 3 side of the reflecting sheet 5 is bent into the shape of a Greek letter Π open sideways and the end thereof travels externally around and spaced apart from the side of the light emitter 3 disposed close to the light guide plate 1 to reach the front face of the light guide plate 1. That is, the reflecting sheet 5 is bent so as to wrap the light emitter 3 and a portion of the reflecting sheet 5 functions as a lamp reflector. Furthermore, the end portion is overlapped on the front face of the light guiding plate 1 and the reflecting sheet 5 is pressed to the light guide plate 1 by the reflecting sheet contact section 20 of the front face case 6 to prevent emitting light of the light emitter 3 from escaping through a clearance between the light guide plate 1 and the reflecting sheet 5.

The end portion in the wire 4 side of the reflecting sheet 5 is bent in the shape of an erected letter L and placed abutting on a side face of the light guide plate 1 on the wire 4 side thereof. That is, the reflecting sheet 5 is placed facing a face opposite to the light incident face of the light guide plate 1. The end portion reflects light emitted from a side face of the light guide plate 1 thereon to prevent the incident light from the light emitter 3 from leaking through the side face opposite to the light incident face.

Figure 3:
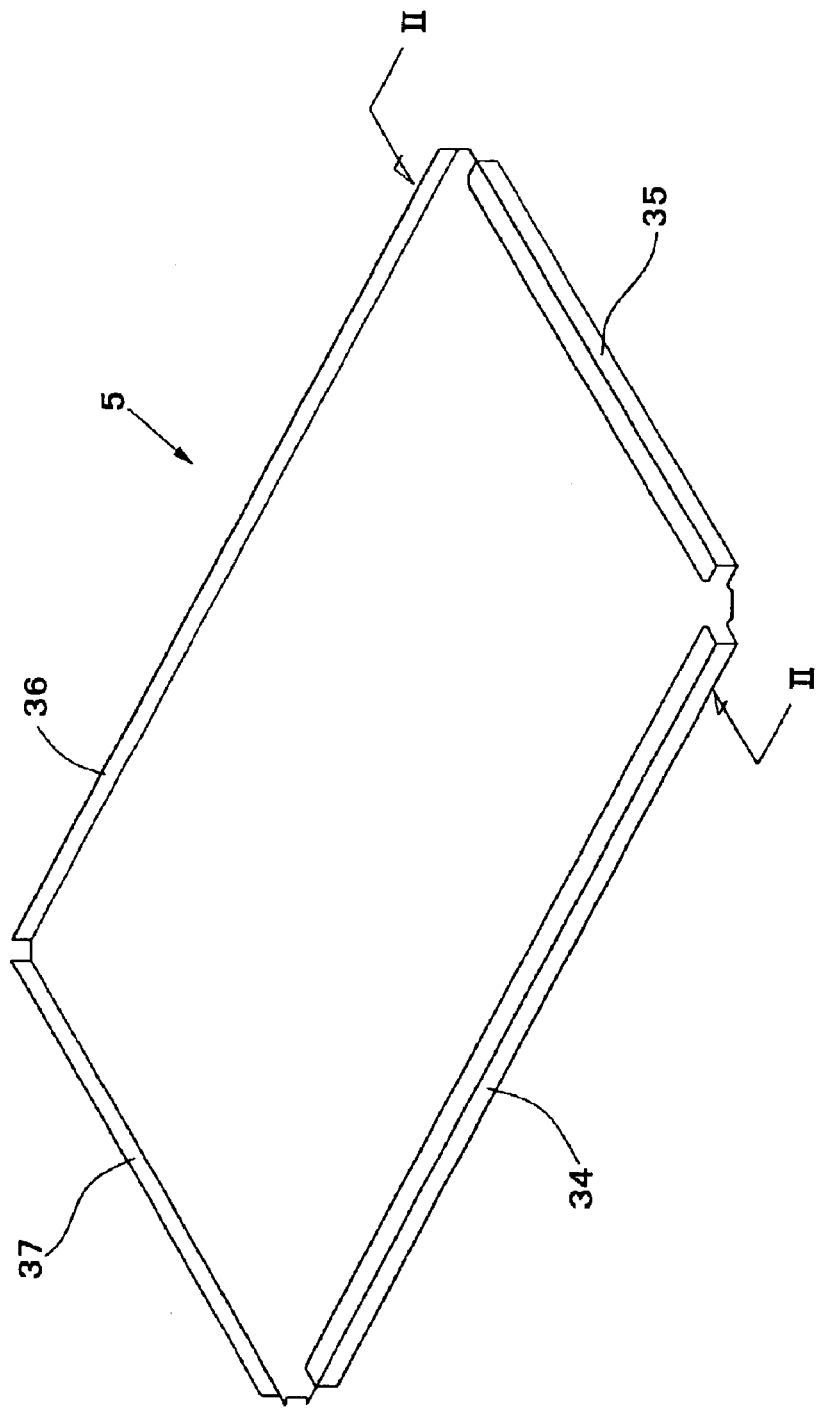
FIG. 3 is a perspective view showing an example of a reflecting sheet 5 of FIG. 1 and the reflecting sheet 5 shown in FIG. 1 corresponds to a section taken along line II—II of FIG. 3.

FIG. 3 is a perspective view showing an example of a reflecting sheet 5 of FIG. 1 and the reflecting sheet 5 shown in FIG. 1 corresponds to a section taken along line II—II of FIG. 3. The end portions 34 and 35 of two sides close to the light emitter 3 of the light emitter unit are bent in the shape of a Greek letter Π open sideways; and the end portions 36 and 37 of two sides adjacent to each other corresponding to the wire 4 are bent in the shape of an erected letter L.

The front face case 6 and rear face case 7 are both constituents of a composite case of a panel light source device obtained by press working on a metal plate such as those of aluminum, iron or the like and engaged with each other to thereby form a slim case of the shape of an approximate box. The front face case 6 is in the shape of an approximate box a rear face of which is open, the rear face case 7 is in the shape of an approximate box a front face of which is open and the front face case 6 is engaged with the rear face case 7 by covering the rear face case 7 inside the front face case 6.

The reflecting sheet exposing section 14 is provided in a side face of the rear face case 7. The reflecting sheet exposing section 14 is an opening section such as a cut-away portion formed in a side face in the wire 4 side of the rear face case 7 in order to expose the bend portion of the reflecting sheet in the shape of an erected letter L to the external environment. With the reflecting sheet exposing section 14 provided, the reflecting sheet 5 can be pushed into the inside from the outside when the light emitter unit is housed into the rear face case 7. Note that the reflecting sheet 5 has only to be exposed when the light emitter unit is housed, thereafter, so a construction also may be adopted in which the reflecting sheet exposing section 14 is closed by the front face case 6 so that no exposure occurs after engagement with the front face case 6.

Figure 4:
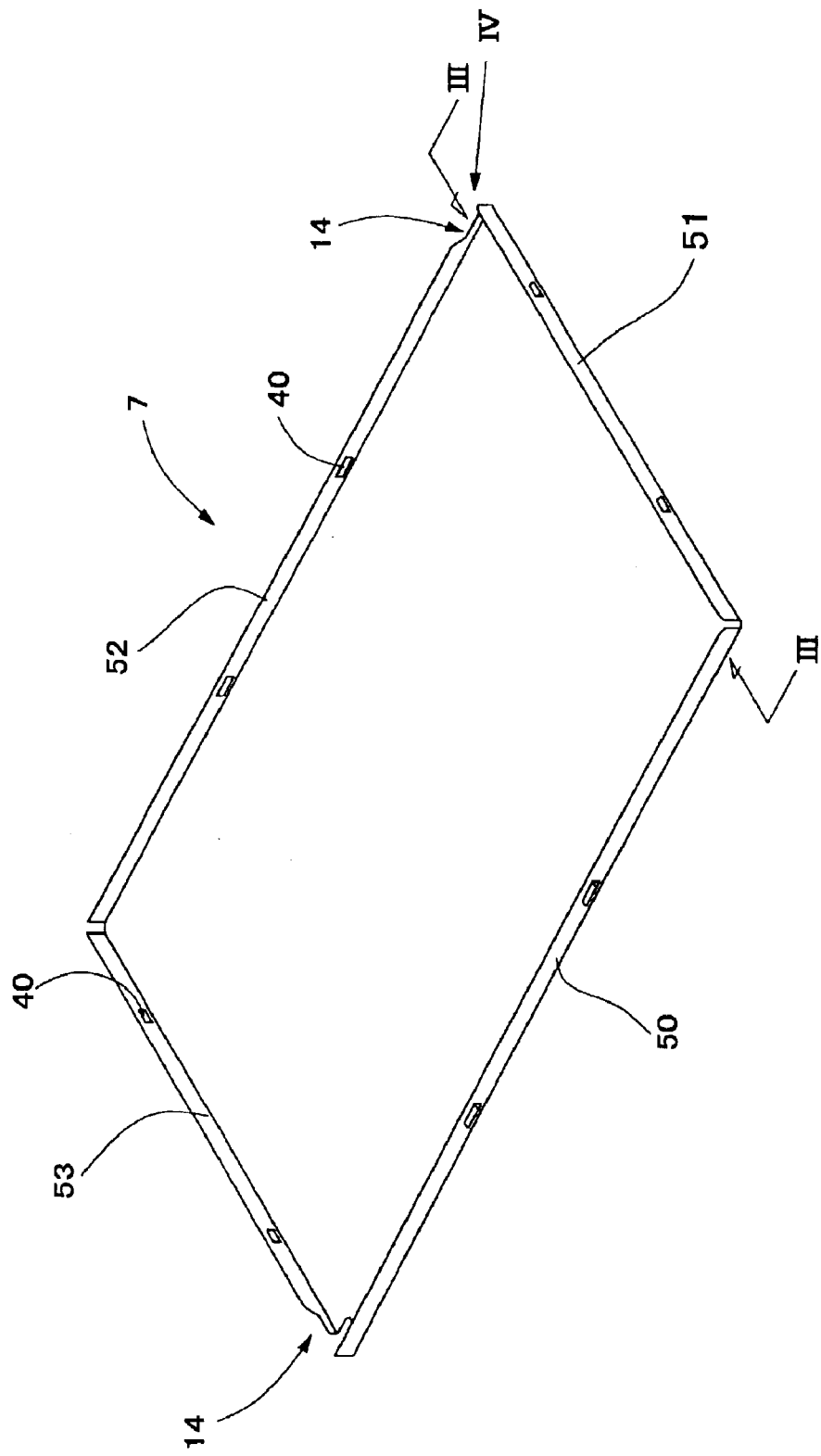
FIG. 4 is a perspective view showing an example construction of a rear face case 7 and the rear face case 7 shown in FIG. 1 corresponds to a section taken along line III—III of FIG. 3.

FIG. 4 is a perspective view showing an example construction of the rear face case 7 and the rear face case 7 shown in FIG. 1 corresponds to a section taken along line III—III of FIG. 4. Side faces 50 to 53 are formed by bending and the rear face case 7 can completely house the constituents (the light guide plate 1, the optical sheet 2, the light emitter 3, the wire 4 and the reflecting sheet 5). The light emitter 3 is disposed inside of the side faces 50 and 51 and the wire 4 is disposed inside of the side faces 52 and 53. Furthermore, engaging sections 40 are provided on the side faces.

Reflecting sheet exposing sections 14 are formed in the side faces 52 and 53. In FIG. 4, both of the reflecting sheet exposing sections 14 are formed at end portions of the side faces 52 and 53. The side faces 52 and 53 are the side faces adjacent to each other of the rear face case 7, and the reflecting sheet exposing sections 14 are formed at both farther ends of the respective side faces 52 and 53 adjacent to each other, in other words, provided at end portions in the discharge electrode sections 30 and 31 sides of the side faces 52 and 53.

The reflecting sheet exposing sections 14 are formed by lowering heights of portions of the respective side faces 52 and 53 to expose the front face side of the reflecting sheet 5 through the reflecting sheet exposing sections 14. That is, the reflecting sheet exposing sections 14 are formed as openings including end portions in the front sides (the open side of the rear face case 7) of the side faces 52 and 53 and each of end portions in the wire 4 direction (end portions in the central sides of the respective faces 52 and 53 in FIG. 4) has a slope so as to be wider in width in the front face side than in the rear face side.

Figure 5:
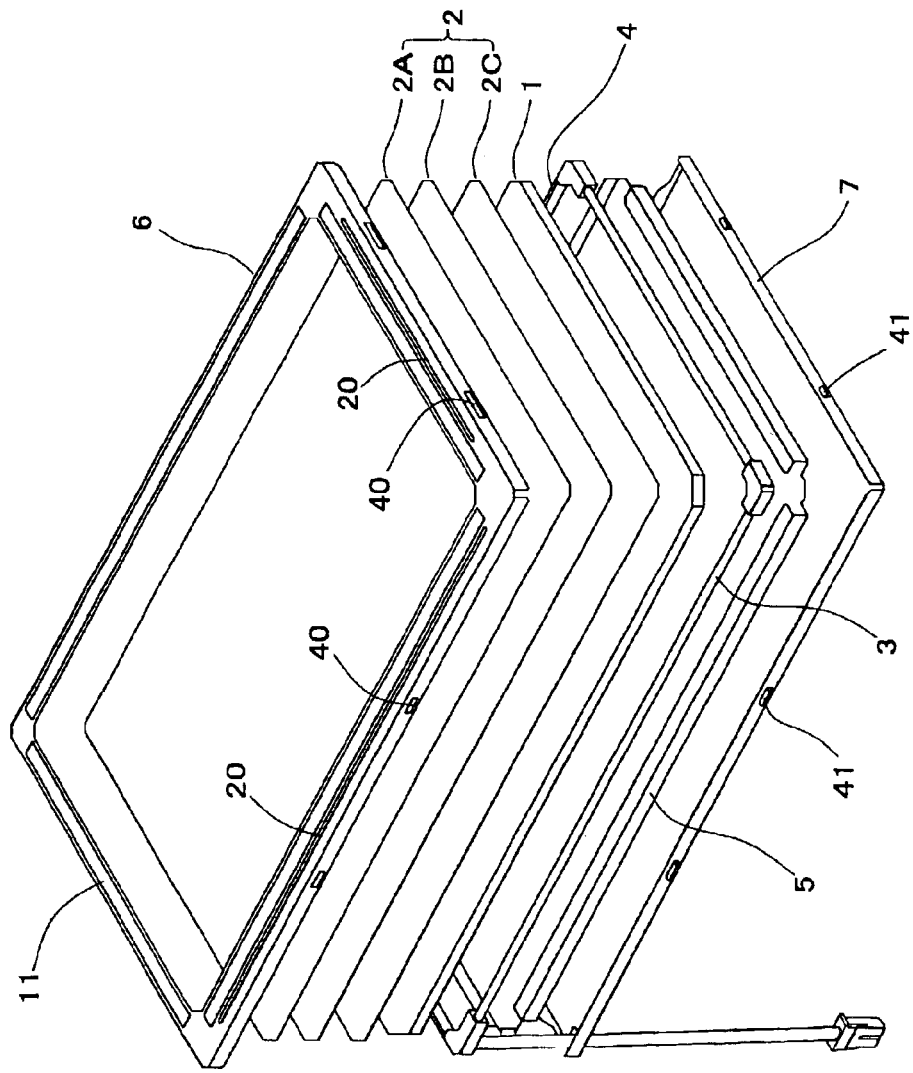
FIG. 5 is a perspective view showing constituents of the panel light source device of FIG. 1 and a way of assembly thereof.

FIG. 5 is a perspective view showing constituents of the panel light source device of FIG. 1 and a way of assembly thereof. The reflecting sheet 5 end portions of which are bent is housed in the rear face case 7 and thereafter, the light emitting unit is housed. On this occasion, the light emitter 3 is housed so as to settle inside of the reflecting sheet 5 in the shape of a Greek letter Π open sideways and the wire 4 is housed so as to settle outside of the reflecting sheet 5 in the shape of an erected letter L. Thereafter, the light guide plate 1 and the optical sheet 2 (a diffusing sheet 2C, a prism sheet 2B and a polarization separation sheet 2A) are housed in the order. The constituents 1 to 5 are housed so as to be completely contained within the rear face case 7, thereafter, the front face case 6 is caused to cover the rear face case 7 inside the front face case 6 and the engaging sections (engaging holes) 40 in the side faces of the front face case 6 are caught by the engaging sections (engaging nail) 41 provided on outside of the side faces of the rear face case for assembly.

Figure 6:
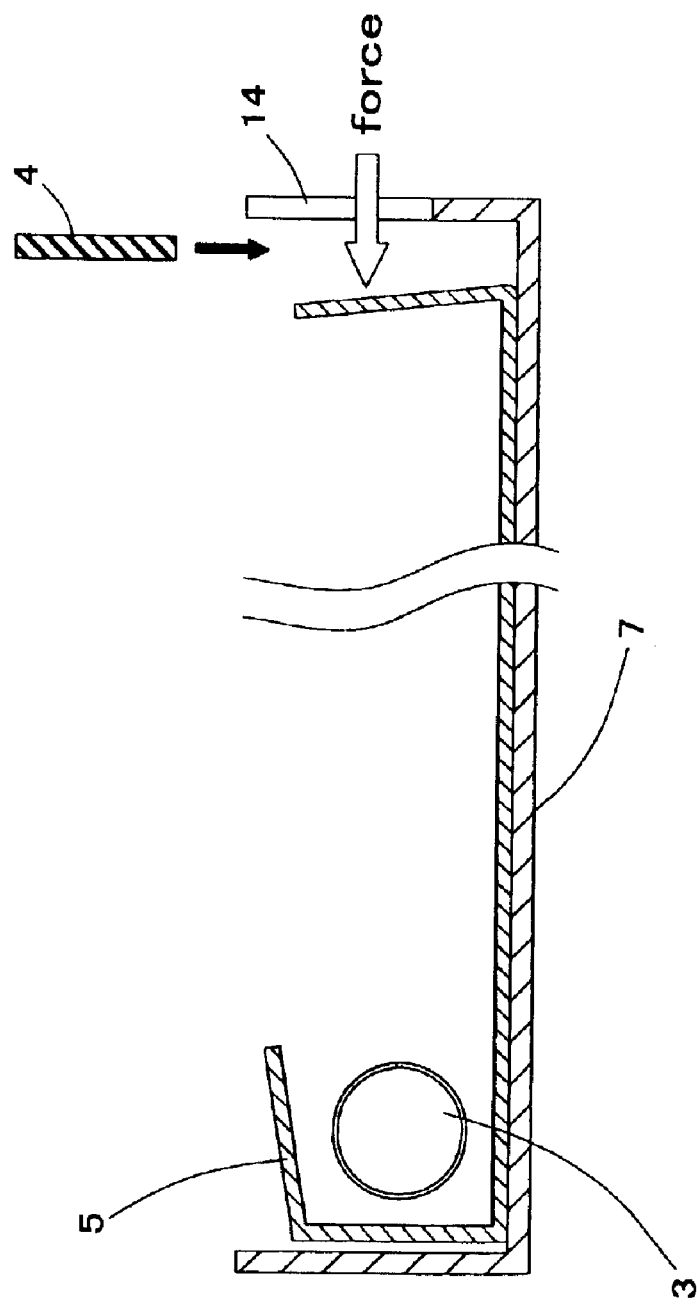
FIG. 6 is a sectional view showing a way of housing a light emitter unit into a rear face case 7.
Figure 10:
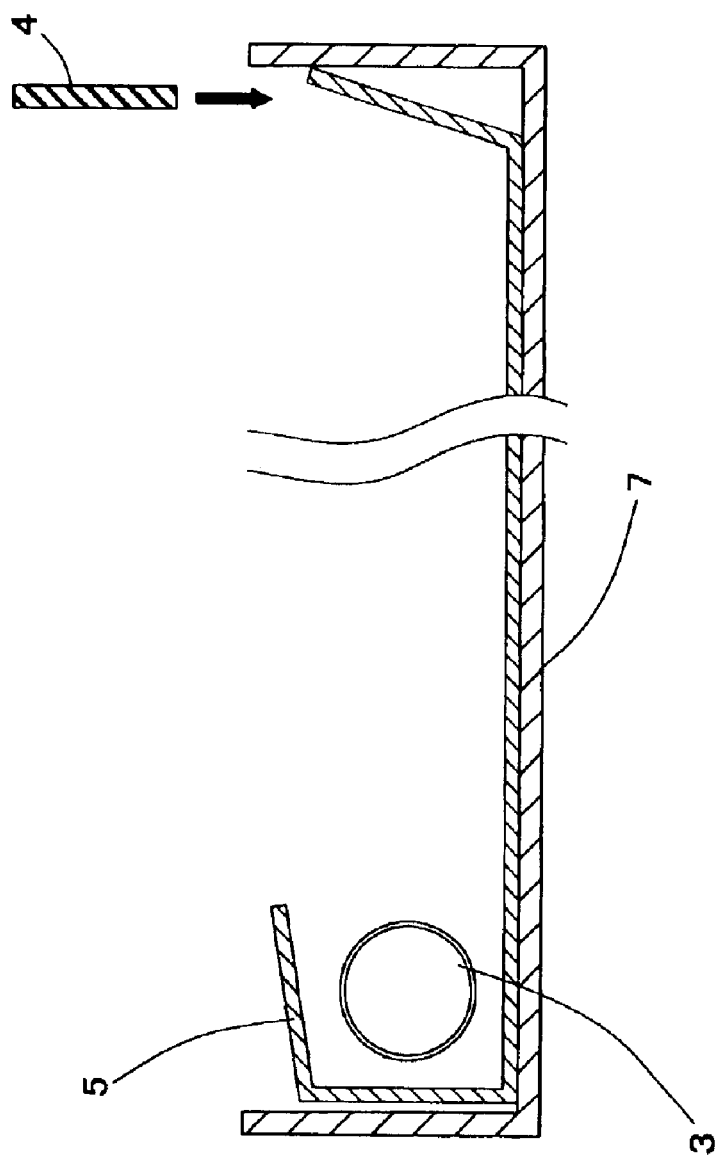
FIG. 10 is a sectional view showing a way of assembly of the panel light source device of FIG. 9.

FIG. 6 is a sectional view showing a way of housing a light emitter unit into the rear face case 7. In cases where bending of the reflecting sheet 5 is insufficient, and where a repulsive force against bending is strong, a bend portion in the shape of a letter L assumes a state of being open in the rear face case 7 as shown in FIG. 10.

The reflecting sheet 5 is completely contained within the rear face case 7, and a height of the bend portion in the shape of an erected letter L is lower than that of a side face of the rear face case 7 while a height of a side face in which the reflecting sheet exposing section 14 is formed is lower than the height of a bend portion of the reflecting sheet 5 in the shape of an elected letter L.

For this reason, the front face side of the reflecting sheet 5 is exposed at the reflecting sheet exposing section 14 and an exposing portion of the reflecting sheet 5 is pushed from the outside with a finger, a tool or the like to thereby press the reflecting sheet 5 inwardly, thereby enabling a clearance between the reflecting sheet 5 and a side face the rear face case 7 for inserting the wire 4 therebetween to be formed, or alternatively, the clearance can be increased. Hence, the wire 4 can be housed with ease.

Note that in cases where bending of the reflecting sheet 5 is insufficient and where a repulsive force against bending is strong, a clearance arises between an end portion in the shape of a Greek letter Π open sideways of the reflecting sheet 5 and the light guide plate 1 to cause a problem that emitting light from the light emitter 3 leaks as well, but the leakage through the clearance can be prevented by pressing the reflecting sheet 5 to the light guide plate 1 with the reflecting sheet contact section 20.

Figure 7:
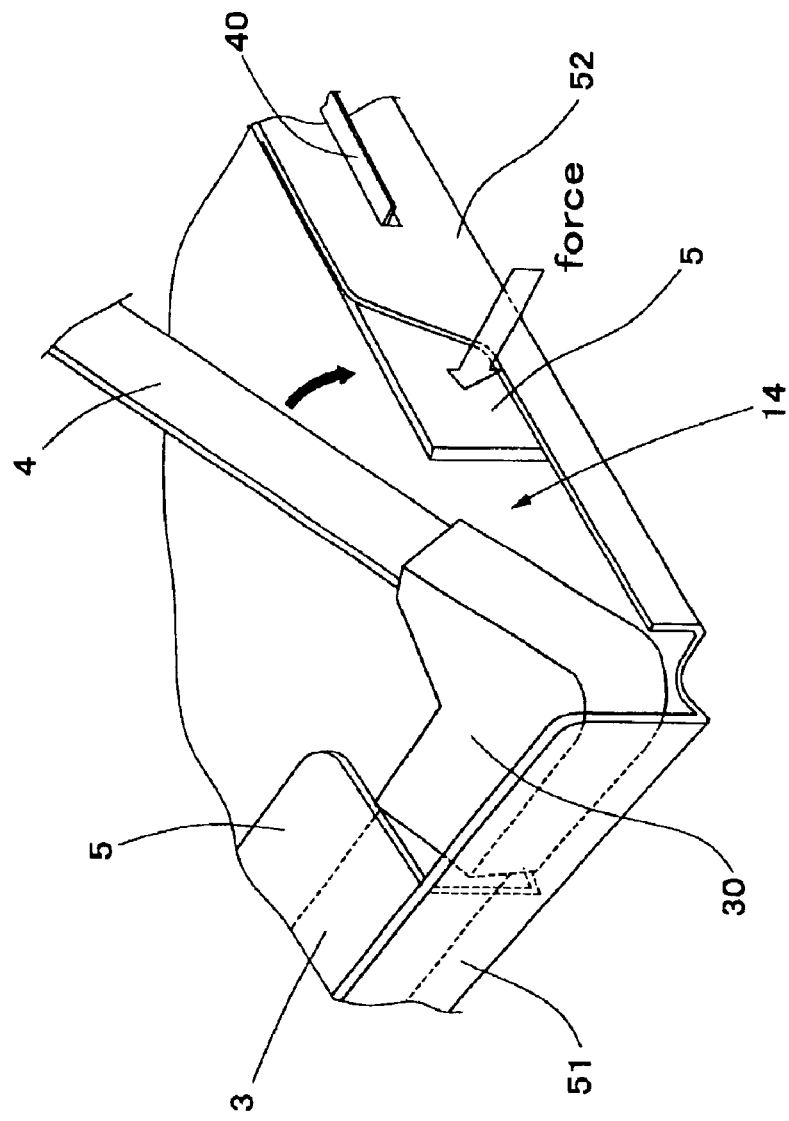
FIG. 7 is a perspective view showing a way of housing a light emitter unit into a rear face case 7 and the view as viewed from a IV direction in FIG. 4.
Figure 8:
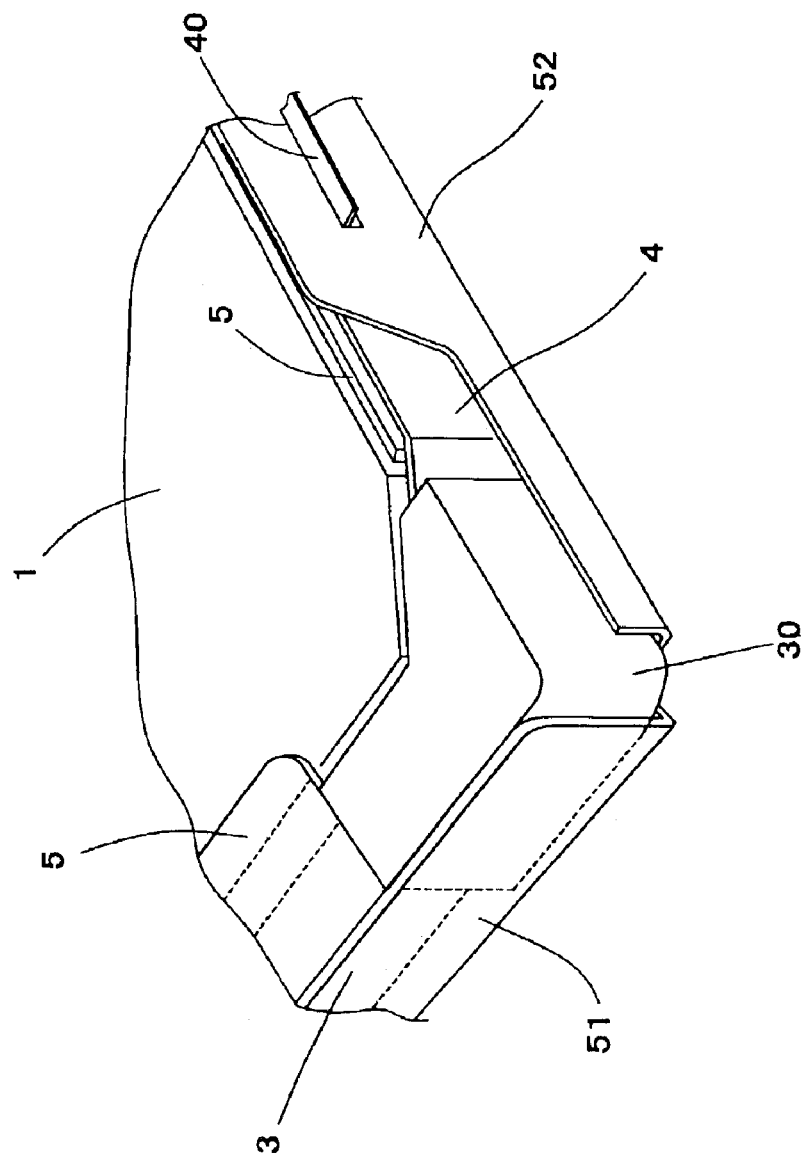
FIG. 8 is a perspective view showing an appearance after a light emitter unit and a light guide plate 1 are housed.
Figure 9:
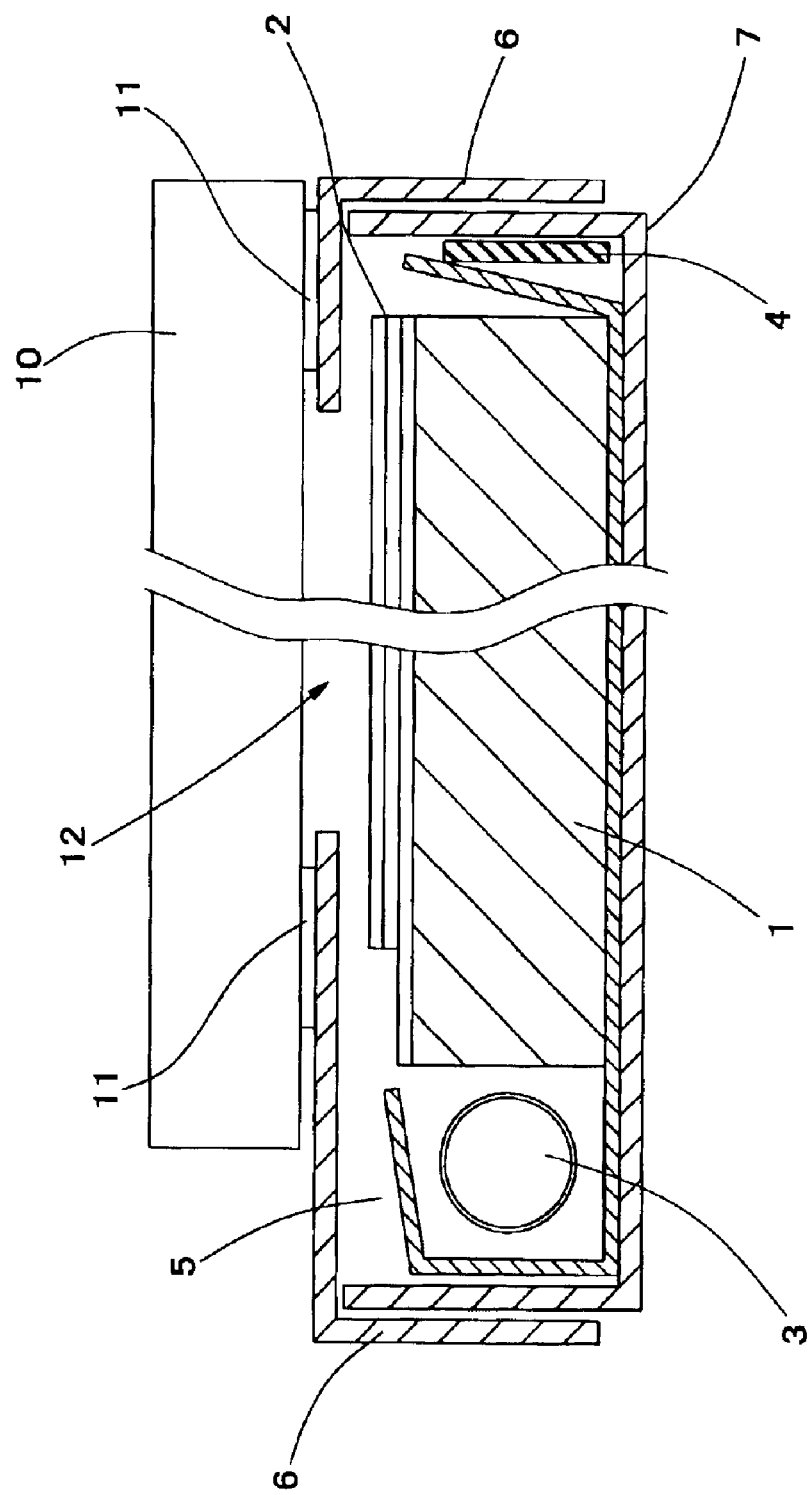
FIG. 9 is a sectional view showing a construction of a conventional panel light source device and shows an example of a liquid crystal display device having a back light device adopting a side light type.

FIG. 7 is a perspective view showing a way of housing a light emitter unit into a rear face case 7 and the view as viewed from a IV direction in FIG. 4. FIG. 8 is a perspective view showing an appearance after a light emitter and a light guide plate 1 are housed.

In a case where the light emitter unit is housed into the rear face case 7, the light emitter 3 is at first placed inside of the bend portion in the shape of a Greek letter Π open sideways of the reflecting sheet 5 and thereafter, the reflecting sheet 5 is pushed inwardly through the reflecting sheet exposing sections 14 to thereby place the wire 4 outside of the bend portion in the shape of an erected letter L of the reflecting sheet 5 with ease. For example, by pressing the wire 4 in the rear face direction along exposed surfaces of the reflecting sheet 5 in the reflecting sheet exposing sections 14, the wire 4 can be housed in a prescribed position while pressing the reflecting sheet 5 inwardly with the wire 4. Note that by providing a slope on an end portion of the reflecting sheet exposing section 14, the reflecting sheet 5 is easier to be pressed inwardly and at the same time, the wire 4 is easier to be housed in a prescribed position.

Since the engaging sections 40 for engaging the rear face case 7 with the front face case 6 are provided on the respective side faces of the rear face case 7, the reflecting sheet exposing sections 14 are desirably formed at farther end portions of the side faces 52 and 53 where the wire 4 is settled. With the reflecting sheet exposing sections 14 formed at the farther end portions, a work in inserting the wire 4 into the clearance is improved on easiness thereof. In a case where the light emitter 3 and the wire 4 of the light emitter unit are housed in this order, the reflecting sheet exposing sections 14 are desirably provided at the end portions of the side faces 52 and 53 of the rear face case 7 in the respective discharge electrode sections 30 and 31 sides.

Furthermore, the side faces of the rear face case 7 performs positioning of the constituents such as the reflecting sheet 5, the light emitter 3, the wire 4 and others. Especially, in a case where the reflecting sheet exposing sections 14 are formed at the end portions in the discharge electrode sections 30 and 31 sides, consideration is necessary to be given to positioning of the discharge electrode sections 30 and 31. Hence, a reflecting sheet exposing section 14 is desirably formed by lowering a height of a corresponding side face than the other portion without completely removing a portion of the corresponding side face so as to expose only the front face side (including an end portion) of the reflecting sheet 5 without exposing at least the rear face side (a bend position). Hence, a height of the corresponding side face at a reflecting sheet exposing section 14 is desirably in the range of from 20 to 80% of a height of the other portion of the corresponding side face.

Moreover, the engaging sections 40 are desirably provided at positions close to both ends of each side face so that the composite case is not opened because of a shock, vibrations and others in transportation. For this reason, a reflecting sheet exposing section 14 is desirably 15 mm or less and more desirably 10 mm or less in length in the wire direction.

Note that while in the above embodiment, description is given of the example of a panel light source device using a metal case, no specific limitation is placed on such a panel light source device in the present invention but the present invention can be applied to a panel light source device using a case made of one of other materials, for example using a resin case as well. In addition, while description is given of the example of a panel light source device using a flat cable as the wire 4, no specific limitation is placed on such a panel light source device in the present invention, but the present invention can be applied to a panel light source device using wires of other shapes, for example a wire with a circular section, and the like. Moreover, while description is given of the example of a liquid crystal display device, a panel light source device according to the present invention is not limited to a panel light source device dedicated to a liquid crystal display device, but can be applied to various kinds of applications and devices as a slim light source device. The entire disclosure of a Japanese Patent Application No. 2002-084154, filed on Mar. 25, 2002 including specification, claims, drawings and summary, on which the Convention priority of the present application is based, is incorporated herein by reference in its entirety.

What is claimed is:

1. A panel light source device comprising:
    a light guide plate emitting light, incident thereon, from a front face of said light guide plate;
    a reflecting sheet, provided facing a rear face of the light guide plate, and an end of which sheet is bent, so as to face a side face of the light guide plate;
    a wire disposed at a side face of the light guide plate sandwiching the reflecting sheet between said wire and said light guide plate; and
    a slim case housing the light guide plate, the reflecting sheet and the wire, wherein
    the slim case is constructed of a rear face case and a front face case engaged with the rear face case, a front face of which said rear case is open, the light guide plate, the reflecting sheet and the wire being inserted in said rear case through the front face of said rear case, and wherein
    the rear face case has a reflecting sheet exposing section formed so that a height of a portion of a side face of the rear face case, which face is adjacent said wire, is lower than the height of a remaining portion of said side face, to thereby expose and make accessible the reflecting sheet.

2. A panel light source device comprising:

a light guide plate emitting light, incident thereon, from a front face of said light guide plate;

a reflecting sheet, provided facing a rear face of the light guide plate, and an end of which sheet is bent so as to face a side face of the light guide plate;

a wire disposed at a side face of the light guide plate sandwiching the reflecting sheet between said wire and said light guide plate; and a slim case housing the light guide plate, the reflecting sheet and the wire, wherein the slim case is constructed of a rear face case and a front face case engaged with the rear face case, a front face of which said rear case is open, the light guide plate, the reflecting sheet and the wire being inserted in said rear case through the front face of said rear case; and wherein the rear face case has a reflecting sheet exposing section including an open end portion, for exposing and making accessible the reflecting sheet, at a portion of a side face of said rear case which face is adjacent said wire.

3. A panel light source device comprising:

a light guide plate emitting light, incident thereon, from a front face of said light guide plate;

a reflecting sheet, provided facing a rear face of the light guide plate, and an end of which sheet is bent so as to face a side face of the light guide plate;

a wire disposed at a side face of the light guide plate sandwiching the reflecting sheet between said wire and said light guide plate; and a slim case housing the light guide plate, the reflecting sheet and the wire, wherein the slim case is constructed of a rear face case and a front face case engaged with the rear face case, a front face of which said rear case is open, the light guide plate, the reflecting sheet and the wire being inserted in said rear case through the front face of said rear case and wherein the rear face case has a reflecting sheet exposing section shaped so as to expose and make accessible a portion of the reflecting sheet, including an end portion of the reflecting sheet, at a location on said rear face case adjacent said wire.

4. The panel light source device according to claim 1, wherein the rear face case is in the shape of an approximate box, and the reflecting sheet exposing section is formed at an end portion of a side face of the rear face case adjacent said wire.

5. The panel light source device according to claim 1, wherein the wire is disposed extending over a plurality of side faces adjacent to each other of the light guide plate, and the reflecting sheet exposing sections are formed at respective farther end portions of side faces, adjacent to each other, of the rear face case, along which the wire is provided.

6. The panel light source device according to claim 1, wherein an end portion of the reflecting sheet exposing section is formed with an angle opening upwardly so that a width, of the front face side of the reflecting sheet exposing section, is wider than that of the rear face side thereof.

7. A fabrication process for a panel light source device comprising the steps of:

inserting a reflecting sheet, bent at a end portion, into a rear face case, a front face of which case is open;

inserting a light emitter unit, which comprises a light emitter and a wire, into the rear face case, by not only placing the light emitter onto the reflecting sheet, but also inserting the wire into a clearance between the reflecting sheet and a side face of the rear face case, while pressing the reflecting sheet, from the outside of a side face of the rear face case, through the reflecting sheet exposing section provided, onto the face of the rear face case;

then inserting a light guide plate into the rear face case; and engaging a front face case with the rear face case.

8. The panel light source device according to claim 1, wherein the rear face case has a sidewall, at said reflecting sheet exposing section, having a height in the range from 20% to 80% of height of other sidewalls of said rear face case.

9. The panel light source device according to claim 1, wherein said end of the reflecting sheet is bent so that the end is angled away from the side face of the light guide plate.

* * * * *